US012368181B2

(12) United States Patent
Kim et al.

(10) Patent No.: US 12,368,181 B2
(45) Date of Patent: Jul. 22, 2025

(54) ELECTRODE ASSEMBLY, AND APPARATUS AND METHOD FOR MANUFACTURING THE SAME

(71) Applicant: LG Energy Solution, Ltd., Seoul (KR)

(72) Inventors: Won Nyeon Kim, Daejeon (KR); Hyun Kyung Shin, Daejeon (KR); Su Taek Jung, Daejeon (KR); Soon Kwan Kwon, Daejeon (KR); Byeong Kyu Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 604 days.

(21) Appl. No.: 17/769,901

(22) PCT Filed: Oct. 12, 2020

(86) PCT No.: PCT/KR2020/013887
§ 371 (c)(1),
(2) Date: Apr. 18, 2022

(87) PCT Pub. No.: WO2021/118033
PCT Pub. Date: Jun. 17, 2021

(65) Prior Publication Data
US 2022/0393225 A1 Dec. 8, 2022

(30) Foreign Application Priority Data
Dec. 11, 2019 (KR) .................. 10-2019-0164940

(51) Int. Cl.
*H01M 50/449* (2021.01)
*H01M 4/62* (2006.01)
(Continued)

(52) U.S. Cl.
CPC ....... *H01M 10/0463* (2013.01); *H01M 4/622* (2013.01); *H01M 10/0404* (2013.01); *H01M 50/461* (2021.01)

(58) Field of Classification Search
CPC .......... H01M 10/0463; H01M 50/461; H01M 4/622; H01M 10/0404; H01M 10/0481;
(Continued)

(56) References Cited

U.S. PATENT DOCUMENTS 5,478,362 A 12/1995 Oota et al.
2007/0154790 A1 7/2007 Jeung et al.
(Continued)

FOREIGN PATENT DOCUMENTS

CA 1166307 A 4/1984
CN 110071322 A * 7/2019
(Continued)

OTHER PUBLICATIONS

International Search Report for Application No. PCT/KR2020/013887 mailed Jan. 18, 2021, 2 pages.
(Continued)

*Primary Examiner* — Yoshitoshi Takeuchi
(74) *Attorney, Agent, or Firm* — Lerner David LLP (57) ABSTRACT

A method for manufacturing an electrode assembly according to the present invention comprises: a step (a) of transferring an electrode, in which a plurality of electrodes and a plurality of separators are alternately stacked, to a first position; a step (b) of forming an adhesive layer on both side portions of the separators, which are provided in the electrode assembly disposed at the first position, in a full width direction; a step of (c) of allowing the pair of pressing blocks provided at a second position to move in a direction corresponding to each other, wherein an interval between the pair of pressing blocks is less than a length of each of the separators in a full width direction and is greater than a length of each of the electrodes in a full width direction; a step (d) of allowing both the side portions of the separator to be bent upward while being in contact with the pressing
(Continued)

blocks when the electrode assembly disposed at the first position descends to be inserted between the pair of pressing blocks provided at the second position; and a step (e) of allowing both the bent side portions of the separator to be adhered each other by an adhesive layer while overlapping each other when the pair of pressing blocks moves toward the electrode assembly.

11 Claims, 10 Drawing Sheets

(51) Int. Cl.
*H01M 10/04* (2006.01)
*H01M 50/46* (2021.01)
*H01M 50/463* (2021.01)
*H01M 50/466* (2021.01)

(58) Field of Classification Search
CPC .......... H01M 10/0468; H01M 50/449; H01M 50/466; H01M 50/463
See application file for complete search history.

(56) References Cited

U.S. PATENT DOCUMENTS

| | | |
|---|---|---|
| 2008/0305398 A1 | 12/2008 | Komiya |
| 2012/0121965 A1 | 5/2012 | Makino et al. |
| 2014/0315074 A1 | 10/2014 | Kong |
| 2015/0228963 A1 | 8/2015 | Kim et al. |
| 2016/0087252 A1* | 3/2016 | Hong .................. H01M 50/193 429/185 |
| 2017/0005318 A1 | 1/2017 | Otohata |
| 2017/0092986 A1* | 3/2017 | Ogawa .............. H01M 10/0525 |
| 2019/0348655 A1* | 11/2019 | Kim .................... H01M 50/429 |

FOREIGN PATENT DOCUMENTS

| | | | |
|---|---|---|---|
| EP | 0053268 | A1 | 6/1982 |
| JP | H06223860 | A | 8/1994 |
| JP | H06077157 | U | 10/1994 |
| JP | H10172531 | A | 6/1998 |
| JP | 2007103287 | A | 4/2007 |
| JP | 4293247 | B2 | 7/2009 |
| JP | 2011086506 | A | 4/2011 |
| JP | 5830953 | B2 | 12/2015 |
| JP | WO2015147066 | A1 | 4/2017 |
| JP | 2018018666 | A | 2/2018 |
| JP | 6521825 | B2 | 5/2019 |
| JP | 2019179654 | A | 10/2019 |
| KR | 20040042373 | A | 5/2004 |
| KR | 20070073169 | A | 7/2007 |
| KR | 100853619 | B1 | 8/2008 |
| KR | 20100070008 | A | 6/2010 |
| KR | 20150036926 | A | 4/2015 |
| KR | 2015-0056229 | A | 5/2015 |
| KR | 20150049458 | A * | 5/2015 |
| KR | 20150049768 | A | 5/2015 |
| KR | 20160109408 | A | 9/2016 |
| KR | 20160132566 | A | 11/2016 |
| KR | 20160133243 | A | 11/2016 |
| KR | 20180050133 | A * | 11/2016 |
| KR | 20190092019 | * | 1/2018 |
| KR | 102328527 | B1 * | 12/2018 |
| KR | 102018256 | B1 | 10/2019 |
| WO | WO 2018021590 | A1 * | 7/2016 |

OTHER PUBLICATIONS

Search Report dated Mar. 14, 2024 from the Office Action for Chinese Application No. 202080069120.0 issued Mar. 16, 2024, 2 pages.

* cited by examiner

ELECTRODE ASSEMBLY, AND APPARATUS AND METHOD FOR MANUFACTURING THE SAME

CROSS-REFERENCE TO RELATED APPLICATION

The present application is a national phase entry under 35 U.S.C. § 371 of International Application No. PCT/KR2020/013887, filed on Oct. 12, 2020, published in Korean, which claims priority to Korean Patent Application No. 10-2019-0164940, filed on Dec. 11, 2019, the disclosures of which are incorporated herein by reference in their entireties.

TECHNICAL FIELD

The present invention relates to an electrode assembly in which a side portion of a separator protruding from an electrode is improved in adhesive force and prevented from being folded, and an apparatus and method for manufacturing the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can-type secondary battery, in which an electrode assembly is embedded in a metal can, and a pouch-type secondary battery in which an electrode assembly is embedded in a pouch.

The pouch-type secondary battery comprises an electrode assembly, an electrode lead coupled to the electrode assembly, and a pouch accommodating the electrode assembly in a state in which a front end of the electrode lead is drawn out to the outside, and the electrode assembly has a structure in which electrodes and separators are alternately stacked. In addition, the electrode comprises a coating portion coated with an electrode active material and an electrode tab without the electrode active material. Here, the electrode tab is provided at an end of the electrode disposed in a full length direction of the electrode assembly.

In the pouch-type secondary battery, the separator disposed in the full length direction of the electrode assembly is bonded to prevent the electrode from moving by the electrode tab.

However, in the case of the pouch-type secondary battery, if the electrode and the separator are separated from each other during movement of the electrode assembly accommodated in the pouch or an impregnation process of an electrolyte, the electrode may move in a full width direction of the separator to cause short circuit, and a side portion of the separator in the full width direction may be folded while colliding with the pouch.

DISCLOSURE OF THE INVENTION

Technical Problem

The present invention is invented to solve the above problems, and the present invention is configured to prevent an electrode from being drawn out of a separator by bonding a side potion of the separator disposed in a full width direction, thereby preventing short circuit from occurring. Particularly, an object of the present invention is to provide an electrode assembly capable of preventing a side portion of a separator in a full width direction from being folded, and as a result of preventing the side portion of the separator from being deformed, and an apparatus and method for manufacturing the same.

Technical Solution

A method for manufacturing an electrode assembly according to the present invention for achieving the above objects may comprise: a step (a) of transferring an electrode assembly, in which a plurality of electrodes and a plurality of separators are alternately stacked, to a first position; a step (b) of forming an adhesive layer on both side portions of the separators, which are provided in the electrode assembly disposed at the first position, in a full width direction; a step of (c) of allowing the pair of pressing blocks provided at a second position to move in a direction corresponding to each other, wherein an interval between the pair of pressing blocks is less than a length of each of the separators in a full width direction and is greater than a length of each of the electrodes in a full width direction; a step (d) of allowing both the side portions of the separator to be bent upward while being in contact with the pressing blocks when the electrode assembly disposed at the first position descends to be inserted between the pair of pressing blocks provided at the second position; and a step (e) of allowing both the bent side portions of the separator to be adhered each other by an adhesive layer while overlapping each other when the pair of pressing blocks moves toward the electrode assembly.

In the step (a) and the step (b), the electrode assembly may be transferred to the first position by using a gripper, and the electrode assembly disposed at the first position may descend to the second position.

In the step (b), a binder may be injected onto each of both the side portions of the separators provided in the electrode assembly through a binder injector to form the adhesive layer.

The binder may comprise a kind of unsaturated carboxylic acid ester, and the kind of unsaturated carboxylic acid ester may comprise one of polyacrylate, polymethacrylate, polyburyl acrylate, and polyacrylonitrile.

In the step (b), each of both the side portions of the separators provided in the electrode assembly may be plasma-treated using a plasma device to form the adhesive layer.

The step (c) may further comprise a process of forming a coating layer so that the binder is not stained on pressing surfaces of the pair of pressing blocks, which are in contact with both the side portions of the separator.

The coating layer may be made of a silicon (Si) or Teflon material.

In the step (c), the pair of pressing blocks may have a set temperature to heat both the side portions of the separator, which are in contact with the pair of pressing blocks, to improve adhesive force.

The set temperature may range of 60° C. to 90° C.

In the step (e), the pair of pressing blocks may be stopped at a position that is spaced a set distance forward from both ends of the electrode, and the set distance may range of 1 mm to 5 mm.

The step (e) may further comprise an adjusting process of adjusting the position of the electrode assembly so that the electrode assembly is disposed at a center of the pair of pressing blocks, wherein, in the adjusting process, upper portions of the pair of pressing blocks, in which the electrode assembly is inserted therebetween, may be photographed, each of a center line that equally divides the pair of pressing blocks and a center line of the electrode assembly may be measured on a photographed image, and the center line of the pair of pressing blocks and the center line of the electrode assembly may be compared with each other to adjust the position of the electrode assembly by an error value.

An apparatus for manufacturing an electrode assembly according to the present invention may comprise: a gripper configured to transfer an electrode assembly, in which a plurality of electrodes and a plurality of separators are alternately stacked, from a first position to a second position; a binder injector configured to inject a binder onto each of both side portions of the separators, which are provided in the electrode assembly disposed at the first position, in a full width direction to form an adhesive layer; a pair of pressing blocks provided at the second position to bend both the side portions of the separator, which is provided in the electrode assembly, upward to overlap each other when the electrode assembly is transferred to the second position by the gripper, wherein both the side portions of the separators provided in the electrode assembly are adhered to each other in a state of being bent by the adhesive layer.

A coating layer may be formed on pressing surfaces of the pair of pressing blocks so that the binder is not stained on the pressing surfaces, and the coating layer may be made of a silicon (Si) or Teflon material.

The pair of pressing blocks may be provided to be movable in a direction corresponding to or opposite to each other.

An electrode assembly according to the present invention may have a structure, in which a plurality of electrodes and a plurality of separators are alternately stacked in a vertical direction, wherein both side portions of the plurality of separators, which protrude from the electrodes, in a full width direction may be bent to sequentially overlap each other, and both the side portions of the plurality of separators, which are bent to sequentially overlap each other, are adhered to each other by an adhesive layer.

Advantageous Effects

In the method for manufacturing the electrode assembly according to the present invention, the side portion of the separator, which is provided in the electrode assembly, in the full width direction may be bonded in the state of being bent to improve the adhesive force of the separator in the full width direction, thereby preventing the side portion of the separator from being deformed. Particularly, the electrode provided in the electrode assembly may be prevented from being drawn out to the outside to prevent the short circuit from occurring.

BRIEF DESCRIPTION OF THE DRAWINGS

FIGS. 5 to 10 are process charts illustrating the method for manufacturing the electrode assembly according to the second embodiment of the present invention.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Electrode Assembly According to First Embodiment of the Present Invention

Figure 1:
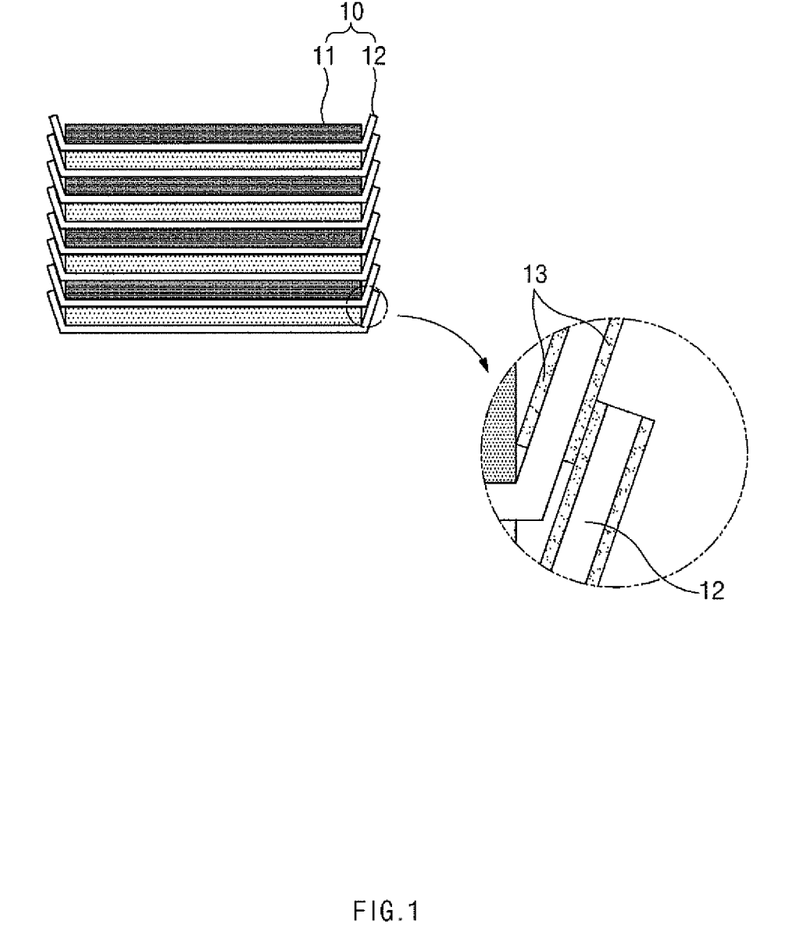
FIG. 1 is a side view of an electrode assembly according to a first embodiment of the present invention.

As illustrated in FIG. 1, an electrode assembly 10 according to a first embodiment of the present invention has a structure in which a plurality of electrodes 11 and a plurality of separators 12 are alternately stacked in a vertical direction.

Here, the electrodes 11 may be a positive electrode and a negative electrode, and each of the separators 12 may have an area greater than that of each of the electrodes 11 so as to prevent short circuit from occurring between the positive electrode and the negative electrode. That is, in the separator 12 may prevent the short circuit from occurring because both ends (hereinafter, referred to as both ends of the separator) of the electrode assembly in a full length direction and both side portions (hereinafter, referred to as both side portions of the separator) of the electrode assembly in a full width direction protrude from the electrode.

Particularly, both the side portions of the separator 12, which protrude from the electrode 11, are bent to sequentially overlap each other in an upward direction. Thus, both the side portions of the separator, which are bent to overlap each other, are adhered to each other by an adhesive layer 13. That is, the adhesive layer 13 is formed between both the side portions of the separator, which are bent to overlap each other. The adhesive layer 13 integrally bonded to both the side portions of the separator, which are bent to overlap each other, through adhesive force. Accordingly, since both side portions of the electrode assembly 10 are finished by both the side portions of the separator 12 to prevent foreign substances from being introduced. Particularly, the occurrence of the short circuit may be prevented by preventing the electrode 11 from being drawn out to the side portions of the separator 12. In addition, both the side portions of the separator 12 may be prevented from being deformed.

The adhesive layer 13 may be formed while a binder is applied or may be formed by performing plasma treatment on both the side portions of the separator.

Here, the binder may comprise a kind of unsaturated carboxylic acid ester. The kind of unsaturated carboxylic acid ester may be one of polyacrylate, polymethacrylate, polyburyl acrylate, and polyacrylonitrile.

Therefore, in the electrode assembly 10 according to the first embodiment of the present invention, both the side portions of the separator 12 may be bent to sequentially overlap each other and then adhered to each other by using the adhesive layer 13, thereby significantly improving the adhesive force of both the side portions of the separator 12 and preventing the short circuit from occurring by preventing the electrode from being drawn out to the outside. Particularly, the side portions of the electrode assembly 10 may be finished to prevent the foreign substances from being introduced.

The electrode assembly 10 having the above-described structure according to the first embodiment of the present invention is manufactured using an apparatus 100 for manufacturing the electrode assembly.

Figure 2:
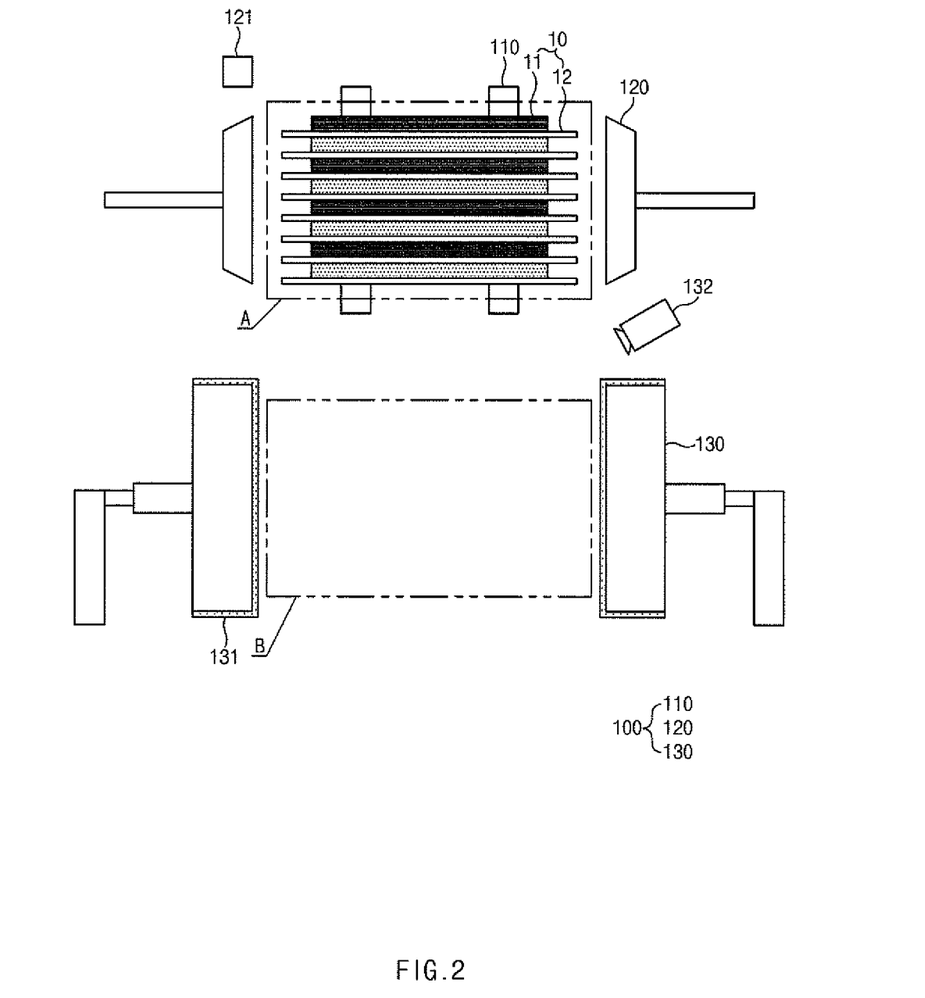
FIG. 2 is a front view illustrating an apparatus for manufacturing an electrode assembly according to a second embodiment of the present invention.
Figure 3:
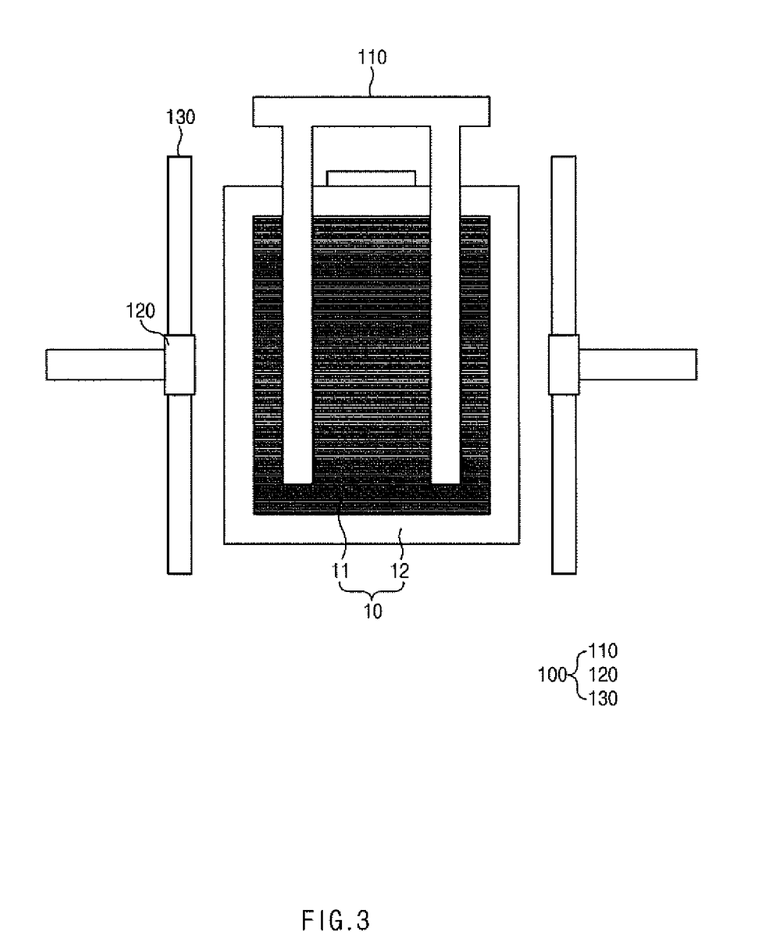
FIG. 3 is a plan view illustrating the apparatus for manufacturing the electrode assembly according to the second embodiment of the present invention.
Figure 4:
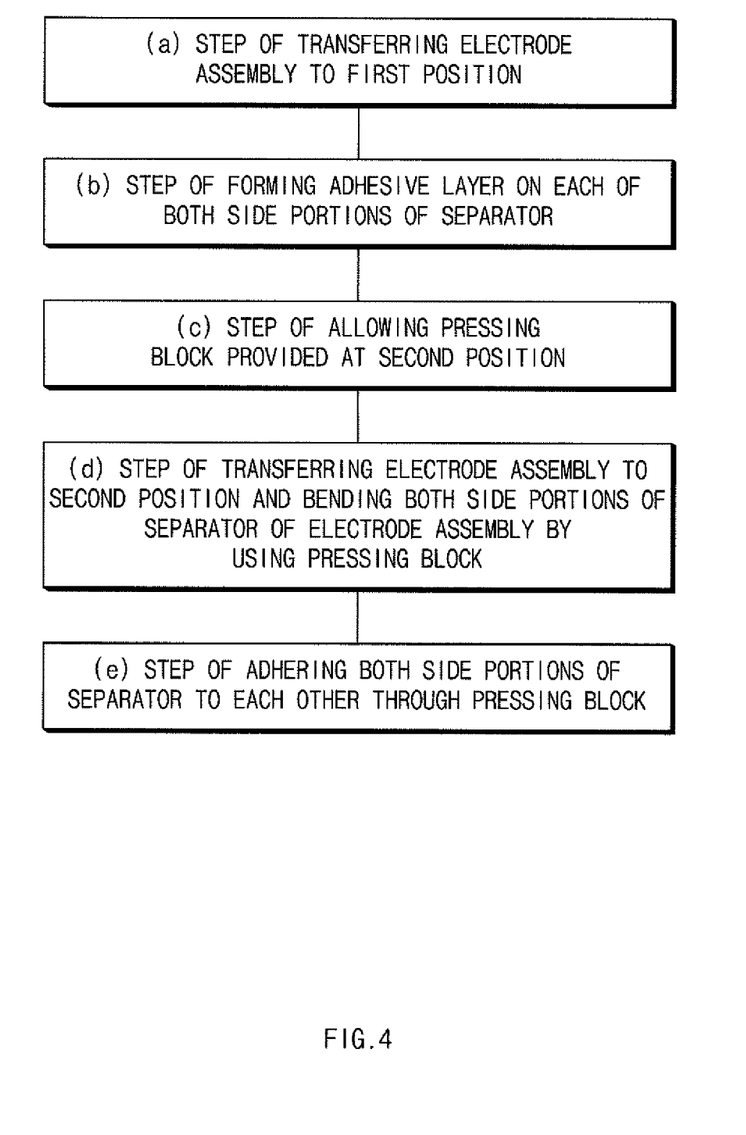
FIG. 4 is a flowchart illustrating a method for manufacturing the electrode assembly according to the second embodiment of the present invention.

Apparatus for Manufacturing Electrode Assembly According to Second Embodiment of the Present Invention As illustrated in FIGS. 2 and 3, an apparatus 100 for manufacturing an electrode assembly according to a second embodiment of the present invention is configured to automatically bend and adhere both side portions of a separator 12 provided in the electrode assembly and comprises a gripper 110, a binder injector 120, and a pair of pressing blocks 130.

Gripper

The gripper 110 is configured to transfer the electrode assembly, for example, grips the electrode assembly disposed at a set position and then transfers the electrode assembly 10 to a second position B via a first position A. Here, the gripper 110 is stopped for a set time at the first position A or the second position B. Accordingly, when the electrode assembly 10 is transferred to the first position A by the gripper 110, an adhesive layer is formed on each of both side portions of a separator 12 provided in the electrode assembly 10. Also, when the electrode assembly 10 is transferred to the second position B by the gripper, both the side portions of the separator 12 provided in the electrode assembly 10 are bent and adhered to each other.

Here, the set position is defined at the uppermost end, the first position A is defined below the set position, and the second position B is defined below the first position A.

Binder Injector

The binder injector 120 is provided at each of both sides in a full width direction of the electrode assembly 10 transferred to the first position A and injects a binder onto each of both the side portions of the separator 12 of the electrode assembly 10 to form an adhesive layer 13. That is, the binder injector 120 forms the adhesive layer 13 on both side surfaces (upper and lower surfaces) of the separator 12.

The apparatus further comprises a sensing sensor 121 that senses whether the electrode assembly 10 transferred to the first position A by the gripper 110 is disposed between the binder injectors 120. If the sensing sensor 121 senses that the electrode assembly 10 is not disposed between the binder injectors 120, the position of the electrode assembly may be adjusted through the gripper 110 so as to be disposed on the same horizontal line as the binder injectors 120.

Pair of Pressing Blocks

A pair of pressing blocks 130 is configured so that both side portions of the separator, on which the adhesive layer is formed, are bent to sequentially overlap each other. The pair of pressing blocks 130 is provided to correspond to the second position B and is provided to be movable in a direction corresponding to or opposite to each other.

That is, since the pair of pressing blocks 130 is disposed at an interval less than a length of the separator in the full width direction at the second position B, both the side portions of the separator 12 provided in the electrode assembly 10 may be bent upward and move in a direction corresponding to each other so that both the bent side portions of the separator are pressed to overlap each other. Particularly, both the side portions of the separator 12, which are bent to overlap each other, are adhered by the adhesive layer 13 to improve bonding force.

Particularly, the pair of pressing blocks 130 has a set temperature, and thus, the pair of pressing blocks 130 may heat both the side portions of the separator 12 while pressing both the side portions of the separator 12. As a result, both the side portions may be effectively bent and adhered.

A coating layer 131 may be formed on a pressing surface of each of the pair of pressing blocks 130 so that the binder is not stained, and the coating layer may be made of a silicon (Si) or Teflon material. Accordingly, it is possible to solve inconvenience of cleaning the pressing surfaces of the pair of pressing blocks 130 each time.

The pair of pressing blocks 130 further comprises an adjusting part 132 configured to adjust the position of the electrode assembly so that the electrode assembly is disposed at a center of the pair of pressing blocks. The adjusting part 132 photographs upper portions of the pair of pressing blocks in which the electrode assembly is inserted therebetween and measures each of a center line O1 of the pair of pressing blocks 130 and a center line O2 of the electrode assembly 10 on a photographed image, and then, compares the center line O1 of the pair of pressing blocks 130 with the center line O2 of the electrode assembly 10 so as to allow the electrode assembly 10 to move by an error value through the gripper 110.

The center line O1 of the pair of pressing blocks 130 refers to a line that equally divides the pair of pressing blocks 130.

In the apparatus 100 for manufacturing the electrode assembly, which has the above-described configuration, according to the second embodiment of the present invention, both the side portions of the separator provided in the electrode assembly may be effectively bent to overlap each other. As a result, the adhesive force of the separator in the full width direction may be significantly improved to prevent the foreign substances from being introduced through the side portions of the electrode assembly.

The apparatus 100 for manufacturing the electrode assembly according to the second embodiment of the present invention has been described as one embodiment to form the adhesive layer by applying the binder to the side portions of the separator, but the adhesive layer may be formed on the side portions of the separator through plasma treatment.

That is, in the apparatus 100 for manufacturing the electrode assembly according to the second embodiment of the present invention, each of both the side portions of the separator provided in the electrode assembly may be plasm-treated using a plasm device instead of the binder injector to form the adhesive layer, and thus, the adhesive layer may be uniformly formed on both the side portions of the separator.

Hereinafter, a manufacturing method using the apparatus 100 for manufacturing the electrode assembly according to the second embodiment of the present invention will be described.

Method For Manufacturing Electrode Assembly According to Second Embodiment of the Present Invention As illustrated in FIGS. 4 to 10, a method for manufacturing an electrode assembly according to the second embodiment of the present invention comprises a step (a) of transferring an electrode 10, in which a plurality of electrodes 11 and a plurality of separators 12 are alternately stacked, to a first position A, a step (b) of forming an adhesive layer 13 on both side portions of the separators 12, which are provided in the electrode assembly disposed at the first position A, in a full width direction, a step (c) of adjusting an interval between a pair of pressing blocks 130 provided at a second position B, a step (d) of allowing both the side portions of the separator 12 to be bent upward while being in contact with the pressing blocks 130 when the electrode assembly 10 disposed at the first position A descends to be inserted between the pair of pressing blocks 130 provided at the second position B, and a step (e) of allowing both the bent side portions of the separators 12 to be adhered each other by an adhesive layer 13 while overlapping each other when the pair of pressing blocks 130 moves toward the electrode assembly 10.

Hereinafter, the method for manufacturing the electrode assembly according to the first embodiment of the present invention will be described in more detail.

Step (a)

Figure 5:
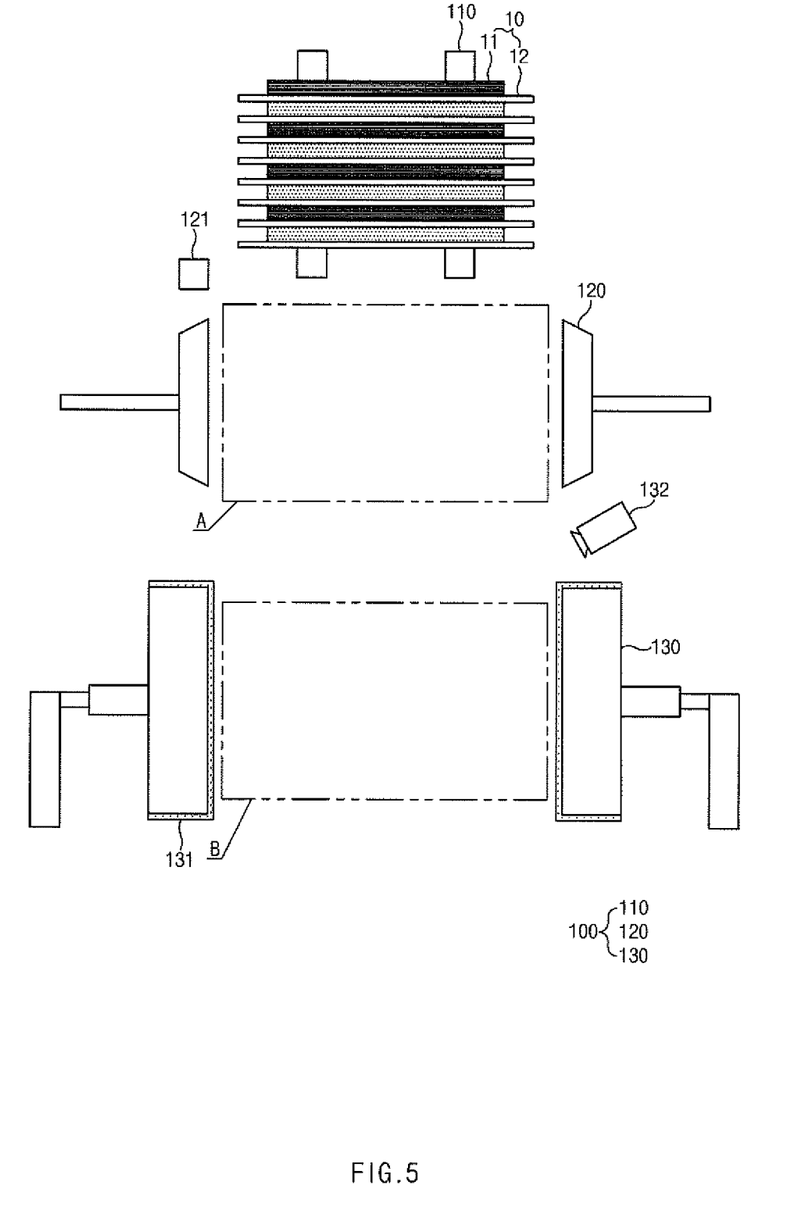
FIG. 5 is a view illustrating a step (a) of preparing an electrode assembly.

In the step (a), as illustrated in FIG. 5, the plurality of electrodes 11 and the plurality of separators 12 are alternately stacked to manufacture the electrode assembly 10, and the manufactured electrode assembly 10 is disposed at a set position. Next, as illustrated in FIG. 6, the electrode assembly 10 disposed at the set position is transferred to the first position A using a gripper 110.

Step (b)

Figure 6:
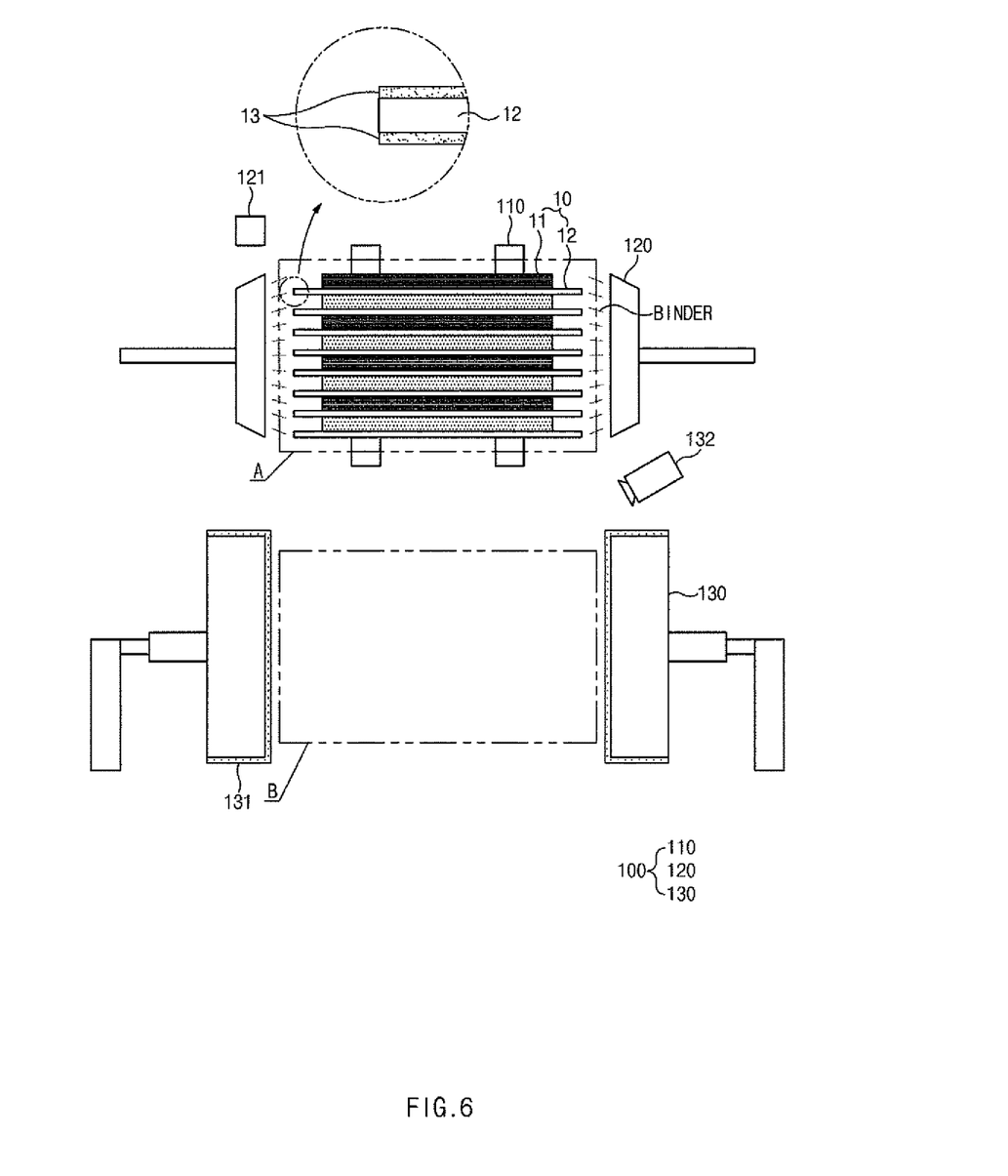
FIG. 6 is a view illustrating a step (b) of transferring the electrode assembly to a position A.

In the step (b), as illustrated in FIG. 6, when the electrode assembly 10 is transferred to the first position A, a binder is injected onto both side portions of the electrode assembly 10 in the full width direction by using a binder injector 120. Then, a binder is applied to each of both the side portions of the separator 12 provided in the electrode assembly 10 to form the adhesive layer 13. That is, the adhesive layer 13 are formed on each of both the side portions of the separator 12.

Here, an injection time of the binder injector 120 may be 2 seconds to 5 seconds. That is, if the injection time is equal to or less than 2 seconds, the binder is not sufficiently applied to both the side portions of the separator 12. If the injection time is equal to or greater than 5 seconds, the binder is excessively applied to both the side portions of the separator 12 and thus flows out of the separator.

The gripper 110 allows the electrode assembly 10 disposed at the set position to descend to the first position A and then allows the electrode assembly 10 disposed at the first position A to descend to the second position B. Then, the gripper 110 allows the electrode assembly 10 disposed at the second position B to descend to a final position.

Here, the binder may comprise a kind of unsaturated carboxylic acid ester. Particularly, the kind of unsaturated carboxylic acid ester may be one of polyacrylate, polymethacrylate, polyburyl acrylate, and polyacrylonitrile.

In the step (b), a plasma device (not shown) instead of the binder injector may be installed at the first position A, and each of both the side portions of the separator provided in the electrode assembly disposed at the first position may be plasma-treated using the plasma device to form the adhesive layer. That is, a problem such as secondary contamination due to the binder may be solved using the plasma device.

Step (c)

Figure 7:
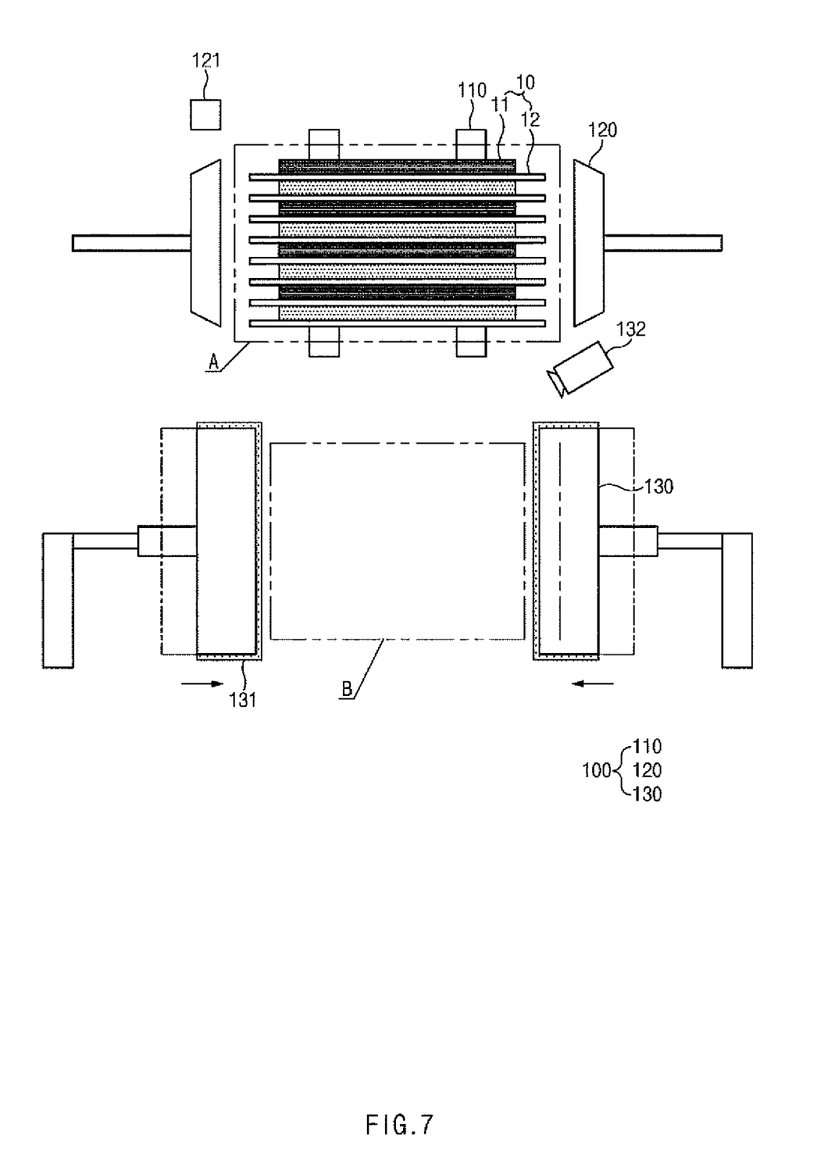
FIG. 7 is a view illustrating a step (c)

In the step (c), as illustrated in FIG. 7, the pair of pressing blocks 130 provided at the second position B move in a direction corresponding to each other. Here, an interval between the pair of pressing blocks 130 is less than a length of the separator 12 in the full width direction and is greater than a length of the electrode 11 in a full width direction. Thus, the pair of pressing blocks 130 may stably press and bend both the side portions of the separator 12. Here, since side portions of the electrode 11 are not pressed, the electrode 11 may be prevented from being deformed.

The step (c) further comprises a process of forming a coating layer 131 so that the binder is not stained on the pressing surfaces of the pair of pressing blocks 130, which are in contact with both the side portions of the separator 12. Here, the coating layer 131 is formed up to top and bottom surfaces of the pressing blocks, to which the pressing surfaces are connected, in addition to the pressing surfaces of the pair of pressing blocks 130. Particularly, the coating layer 121 is provided to be detachable from the pressing blocks 130. Thus, after the pressing blocks 130 are used for a predetermined time, the coating layer 130 formed on the pressing blocks 130 is removed, and then, a new coating layer 130 is formed. Therefore, it is possible to significantly prevent the binder from being stained on the pressing surfaces of the pair of pressing blocks 130.

The coating layer 131 may be made of a silicon (Si) or Teflon material.

In the step (c), the pair of pressing blocks 130 has a set temperature to heat both the side portions of the separator 12, which are in contact with the pair of pressing blocks 130, to melt a portion of the coating layer 13 applied on both the side portions of the separator 12, thereby improving adhesive force.

Here, the set temperature may range of 60° C. to 90° C. That is, if the set temperature is 60° C. or less, the coating layer applied to both the side portions of the separator 12 may not be melted. If the set temperature is 90° C. or more, both the side portions of the separator 12 may be deformed while being shrunk.

Step (d)

Figure 8:
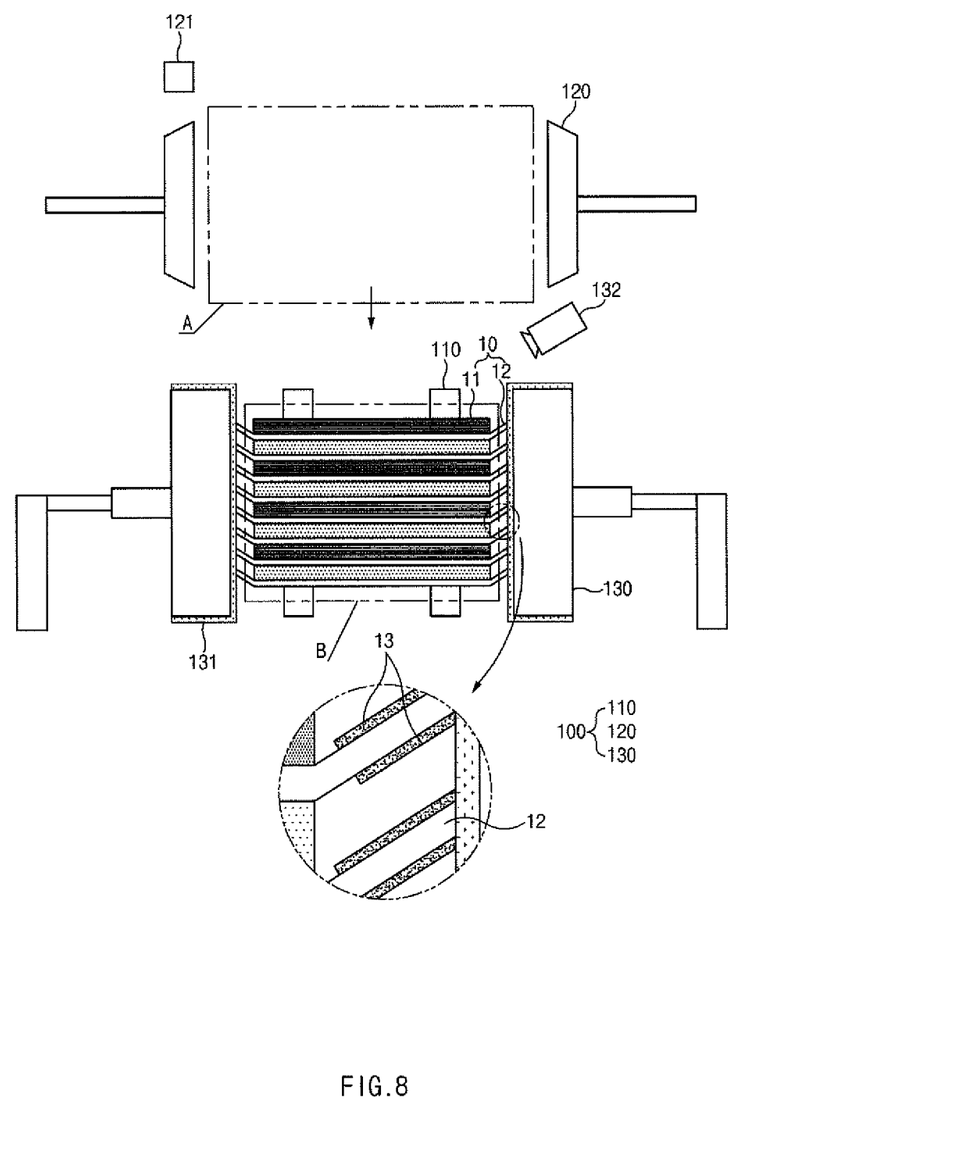
FIG. 8 is a view illustrating a step (d)

As illustrated in FIG. 8, the step (d) is performed to bend both the side portions of the separator. In the step (d), the electrode assembly 10 disposed at the first position A descends to be inserted between the pair of pressing blocks 130 provided at the second position B by using the gripper 110. Then, both the side portions of the separator 12 are bent upward while being in contact with the pressing blocks 130. That is, since the interval between the pair of pressing blocks 130 is less than the length of the separator 12 in the full width direction, both the side portions of the separator 12 are bent upward while being caught on upper portions of the pair of pressing blocks 130.

Step (e)

Figure 10:
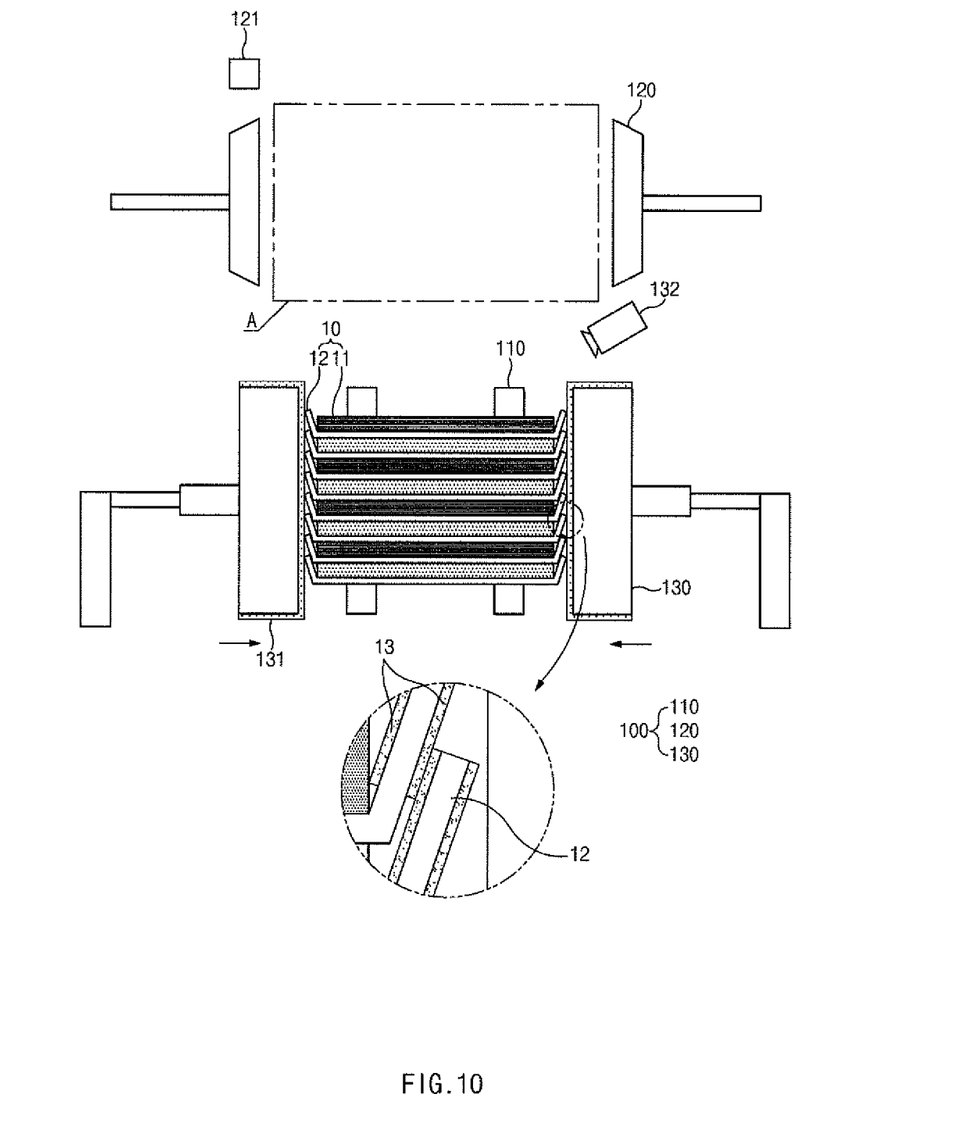
FIG. 10 is a view illustrating a pressing process in step (e).

As illustrated in FIG. 10, the step (e) comprises a process of pressing both the side portions of the separator provided in the electrode assembly. The pair of pressing blocks 130 move toward the electrode assembly 10. Then, both the bent side portions of the separator 12 are bent vertically to overlap each other, and both the overlapping side portions of the separator 12 are adhered to each other by the adhesive layer 13.

Here, in the step (e), the pair of pressing blocks 130 is stopped at a position that is spaced a set distance forward from both ends of the electrode 11. Here, the set distance may range of 1 mm to 5 mm. Thus, both the side portions of the separator 12 may be bent as far as possible without deforming the electrode 11.

Figure 9:
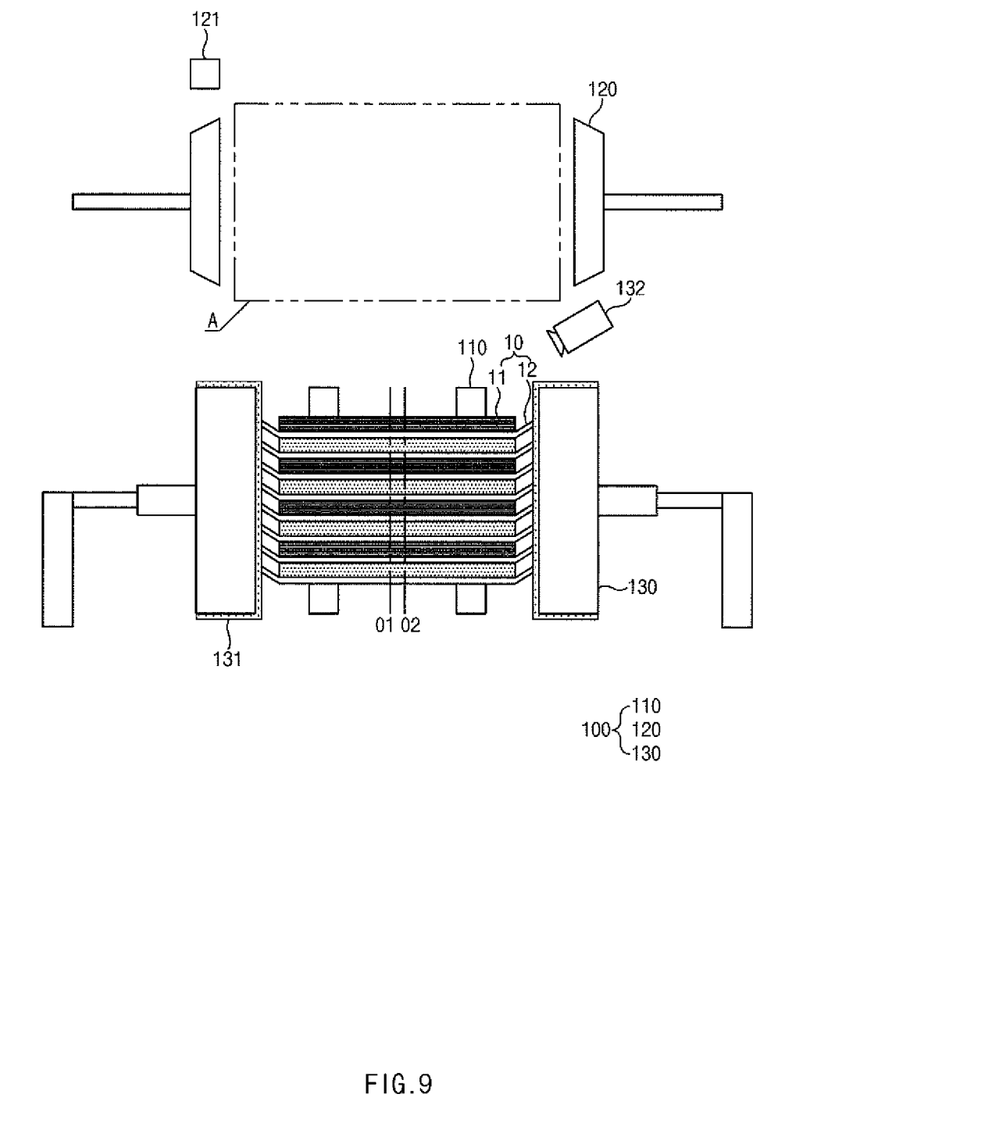
FIG. 9 is a view illustrating a position adjustment process in step (e)

Referring to FIG. 9, the step (e) further comprises an adjusting process of adjusting the position of the electrode assembly 10 so that the electrode assembly 10 is disposed at a center of the pair of pressing blocks 130 before pressing both the overlapping side portions of the separator 12.

That is, in the adjusting process, upper portions of the pair of pressing blocks, in which the electrode assembly is inserted therebetween, are photographed, and each of a center line that equally divides the pair of pressing blocks and a center line of the electrode assembly is measured on a photographed image. Then, the center line of the pair of pressing blocks and the center line of the electrode assembly are compared with each other to adjust the position of the electrode assembly by an error value.

As described above, if the step (e) is ended, the gripper 110 allows the electrode assembly disposed at the second position B to descend to the final position, thereby manufacturing a finished electrode assembly.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Apparatus for manufacturing electrode assembly
110: Gripper
120: Binder injector
130: Pressing block

The invention claimed is:

1. A method for manufacturing an electrode assembly, the method comprising:
    a step (a) of transferring the electrode assembly, in which a plurality of electrodes and a plurality of separators are alternately stacked, to a first position;
    a step (b) of forming an adhesive layer on two opposite side portions of each of the separators in a full width direction, the full width direction being a horizontal direction perpendicular to a vertical stacking direction of the electrodes and the separators;
    a step of (c) of moving a pair of pressing blocks provided at a second position towards each other in the full width direction of the electrodes and the separators, wherein an interval between the pair of pressing blocks is less than a length of each of the separators in the full width direction and is greater than a length of each of the electrodes in the full width direction;
    a step (d) of bending the two opposite side portions of the separators upward while in contact with the pressing blocks when the electrode assembly descends to be inserted between the pair of pressing blocks; and
    a step (e) of adhering adjacent ones of the side portions of the separators to each other by an adhesive layer while overlapping each other when the pair of pressing blocks moves toward the electrode assembly.

2. The method of claim 1, wherein, during the step (a) and the step (b), the electrode assembly is transferred to the first position using a gripper, and the electrode assembly then descends to the second position.

3. The method of claim 1, wherein, during the step (b), a binder is injected onto each of the two opposite side portions of each of the separators through a binder injector to form the adhesive layer.

4. The method of claim 3, wherein the binder comprises a kind of unsaturated carboxylic acid ester, and the kind of unsaturated carboxylic acid ester comprises one of:
    polyacrylate, polymethacrylate, polybutyl acrylate, or polyacrylonitrile.

5. The method of claim 3, wherein the step (c) further comprises a process of forming a coating layer on pressing surfaces of the pair of pressing blocks so that the binder is not stained when the pressing blocks are in contact with the side portions of the separator.

6. The method of claim 5, wherein the coating layer is made of a silicon (Si) or Teflon material.

7. The method of claim 1, wherein, during the step (b), each of the two opposite side portions of each of the separators is plasma-treated using a plasma device to form the adhesive layer.

8. The method of claim 1, wherein, during the step (c), the pair of pressing blocks has a set temperature that heats the side portions of the plurality of separators, which increases an adhesive force of the adhesive layers.

9. The method of claim 8, wherein the set temperature ranges from 60° C. to 90° C.

10. The method of claim 1, wherein, during the step (e), the pair of pressing blocks stops at a position that is spaced a set distance away from a pair of opposite ends of the electrode assembly, and the set distance ranges of 1 mm to 5 mm.

11. The method of claim 1, wherein the step (e) further comprises an adjusting process of adjusting the position of the electrode assembly so that the electrode assembly is disposed at a position that is centered between the pair of pressing blocks,
    wherein, during the adjusting process, upper portions of the pair of pressing blocks, between which the electrode assembly is inserted, are photographed, each of a center line equidistant from the pair of pressing blocks and a center line of the electrode assembly are measured on a photographed image, and the center line equidistant from the pair of pressing blocks and the center line of the electrode assembly are compared with each other to adjust the position of the electrode assembly by an error value.

* * * * *